(12) United States Patent
Mullaney, Jr.

(10) Patent No.: US 6,890,428 B2
(45) Date of Patent: May 10, 2005

(54) FRYER FILTRATION ARRANGEMENT

(75) Inventor: Alfred Edward Mullaney, Jr., Baltimore, MD (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 10/421,098

(22) Filed: Apr. 23, 2003

(65) Prior Publication Data

US 2003/0196940 A1 Oct. 23, 2003

Related U.S. Application Data

(63) Continuation of application No. 09/760,356, filed on Jan. 12, 2001, now Pat. No. 6,572,764.

(51) Int. Cl.[7] .......................... A47J 37/12; B01D 35/027
(52) U.S. Cl. ........................ 210/167; 210/175; 210/232; 210/235; 210/238; 210/416.1; 210/DIG. 8; 99/408
(58) Field of Search .................................. 210/143, 167, 210/175, 232, 235, 236, 238, 416.1, 416.5, 460, DIG. 8, 418; 99/408

(56) References Cited

U.S. PATENT DOCUMENTS

| 445,223 | A | | 1/1891 | Knight |
|---|---|---|---|---|
| 2,359,368 | A | | 10/1944 | Klopfenstein |
| 2,424,211 | A | | 7/1947 | Webb |
| 2,578,129 | A | | 12/1951 | Daugherty |
| 2,610,740 | A | | 9/1952 | Hunter |
| 2,635,527 | A | | 4/1953 | Overbeck et al. |
| 2,760,641 | A | | 8/1956 | Mies, Jr. et al. |
| 2,914,063 | A | * | 11/1959 | Wagner .................. 126/381.1 |
| 3,045,827 | A | | 7/1962 | Hough |
| 3,147,220 | A | | 9/1964 | Avery |
| 3,159,095 | A | | 12/1964 | Wagner |
| 3,263,818 | A | | 8/1966 | Gedrich |
| 3,279,605 | A | | 10/1966 | Shepherd |
| 3,410,199 | A | * | 11/1968 | Quednau .................. 99/403 |
| 3,477,361 | A | * | 11/1969 | Bradshaw .................. 99/408 |
| 3,483,981 | A | | 12/1969 | Gordon |
| 3,608,472 | A | | 9/1971 | Pelster et al. |
| 3,667,374 | A | | 6/1972 | Holmes |
| 3,685,433 | A | | 8/1972 | Cunningham |
| 3,701,313 | A | | 10/1972 | Boggs |

(Continued)

FOREIGN PATENT DOCUMENTS

| DE | 2746728 | 4/1979 |
|---|---|---|
| EP | 0649622 | 4/1995 |

OTHER PUBLICATIONS

Installation, Operation and Care of Models MF50 and MF85 Mobile Filters, Instructions, Vulcan–Hart Company, 1998, pps. 1–12.

Installation and Operation Manual, 47 Series Gas Fryers, Frymaster L.L.C., 11/1998.

Specification Sheet for Filter System for High Efficiency Fryers, Vulcan–Hart Corporation (Nov. 1986).

(Continued)

Primary Examiner—Fred G. Prince
(74) Attorney, Agent, or Firm—Thompson Hine LLP

(57) ABSTRACT

A fryer filtration arrangement includes an oil drain pan and associated filter assembly. The filter assembly may be removably connected to the pan by a friction fit coupling arrangement. The pan may be positioned in latch-free movable drawer. The fryer vat may be shaped such that particulate matter settles therein along a substantially linear region and oil circulated during a filtration operation may flow along the substantially linear region to push the settled particulate matter to the pan and filter assembly.

19 Claims, 6 Drawing Sheets

U.S. PATENT DOCUMENTS

| | | |
|---|---|---|
| 3,735,871 A | 5/1973 | Bisko |
| 3,797,378 A | 3/1974 | Morris |
| 3,894,482 A | 7/1975 | Murphy |
| 3,973,481 A * | 8/1976 | Mies .......................... 99/408 |
| 4,084,492 A | 4/1978 | Sullivan |
| 4,113,623 A | 9/1978 | Koether et al. |
| 4,328,097 A | 5/1982 | Whaley et al. |
| 4,487,691 A | 12/1984 | Panora |
| 4,591,434 A | 5/1986 | Prudhomme |
| 4,604,203 A | 8/1986 | Kyle |
| 4,607,857 A | 8/1986 | LeSage et al. |
| 4,623,544 A | 11/1986 | Highnote |
| 4,747,944 A | 5/1988 | George |
| 4,805,525 A | 2/1989 | Bivens |
| 4,890,548 A | 1/1990 | Grob et al. |
| 4,895,137 A | 1/1990 | Jones et al. |
| 4,899,649 A | 2/1990 | Grob et al. |
| 4,945,893 A | 8/1990 | Manchester |
| 4,974,501 A | 12/1990 | Grob et al. |
| 4,994,181 A | 2/1991 | Mullaney, Jr. |
| 5,247,876 A | 9/1993 | Wilson et al. |
| 5,253,566 A | 10/1993 | McCabe et al. |
| RE34,636 E | 6/1994 | Bivens |
| 5,404,799 A | 4/1995 | Bivens |
| 5,449,469 A | 9/1995 | Burklund et al. |
| 5,486,370 A | 1/1996 | Bivens |
| 5,577,438 A | 11/1996 | Amitrano et al. |
| 5,582,093 A | 12/1996 | Amitrano et al. |
| 5,595,107 A | 1/1997 | Bivens |
| 5,597,601 A | 1/1997 | Griffin |
| 5,680,811 A | 10/1997 | Highnote et al. |
| 5,709,899 A | 1/1998 | Bivens |
| 5,731,024 A | 3/1998 | Bivens |
| 5,743,175 A | 4/1998 | Crain et al. |
| 5,870,945 A | 2/1999 | Bivens |
| 6,235,210 B1 | 5/2001 | Saksena |
| 6,306,294 B1 | 10/2001 | Blair |
| 6,378,420 B1 | 4/2002 | Savage et al. |
| 6,470,794 B2 | 10/2002 | Takahashi |
| 6,572,764 B2 * | 6/2003 | Mullaney, Jr. .............. 210/167 |

OTHER PUBLICATIONS

Operating, Installation, Service & Parts Manual for High Efficiency Fryer Filtermate, Vulcan–Hart Corporation (Jan. 1986).

"Magnum Retrofit Kit Eliminates Filter Paper," Date: 1996, 2 pages.

"840546 Magnum Filter Leaf Kit –Fry Master Footprint II (CxC)," Date: Feb. 1999, 4 pages.

"Kitchen Equipment, Frymaster Filter," Date: Apr. 1999, 1 page.

* cited by examiner

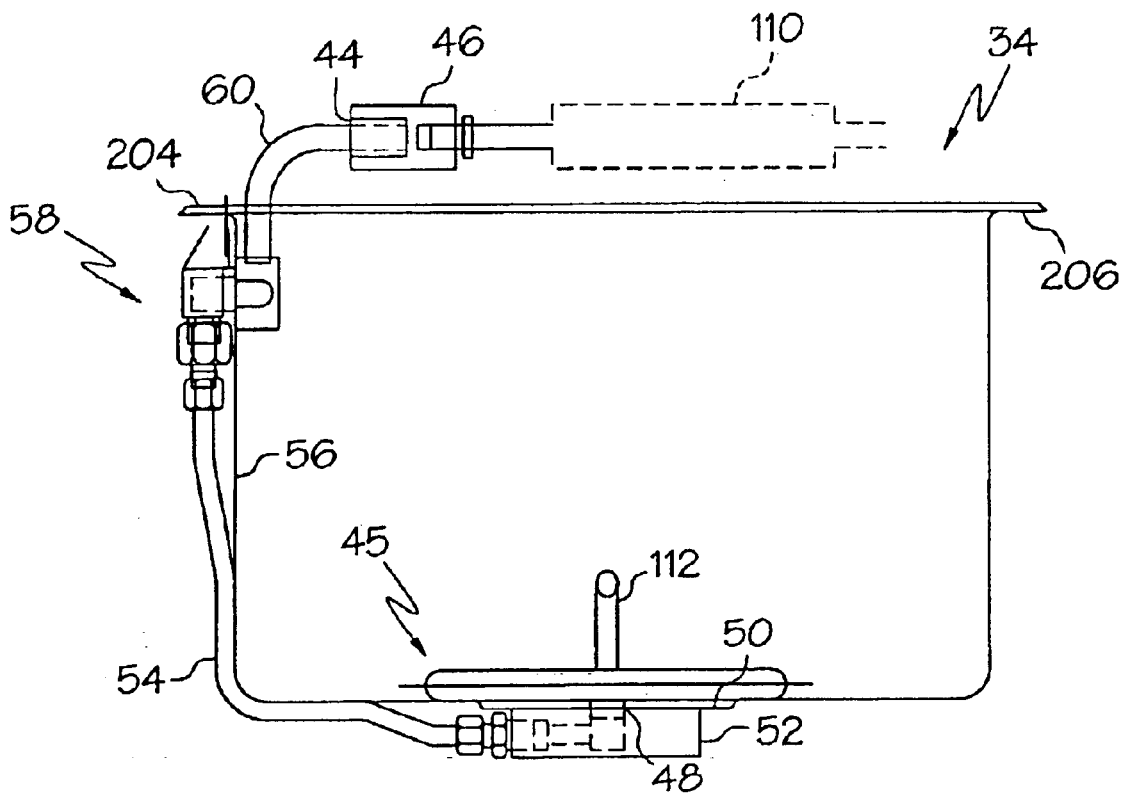
FIG. 2
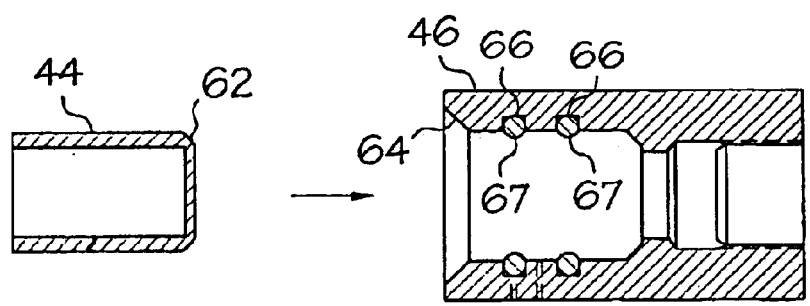
FIG. 3
FIG. 4

FRYER FILTRATION ARRANGEMENT

CROSS-REFERENCE

This application is a continuation of application Ser. No. 09/760,356, filed Jan. 12, 2001 now U.S. Pat. No. 6,572,764.

FIELD OF THE INVENTION

The present invention relates generally to deep-fat fryers and, more particularly, to a deep-fat fryer cooking oil filtration arrangement.

BACKGROUND OF THE INVENTION

A typical deep-fat fryer will include a fryer vat containing a heating bath of cooking oil. The cooking oil is adapted to receive baskets of food products such that the food products will be immersed within and cooked by the heated cooking oil. Such fryers may also include a heat exchanger and a pump. The pump is responsible for continuously pumping the cooking oil from the fryer vat, through the heat exchanger and back into the fryer vat such that the cooking oil remains at a substantially constant temperature, thereby allowing the food products to be evenly and consistently cooked within the fryer vat. More recently, fryers have been manufactured with in vat fire tubes and associated burners, with combusted gases being passed therethrough to heat the oil, eliminating the need to constantly pump the oil from the vat through a heat exchanger.

To extend the useful life of the cooking oil, it is a common practice to filter the particulate food matter from the cooking oil to minimize the carbonization of such food matter within the cooking oil. Some conventional fryers utilize a batch filtration system, in which the cooking oil is drained from the fryer vat and then manually or mechanically filtered before returning the cleansed cooking oil back to the fryer vat. Other conventional fryers utilize a continuous filtration system, in which a continuous filter is placed within the fluid path of the cooking oil, so as to continuously filter the cooking oil as it is being recirculated between the fryer vat and the pump/heat exchanger.

Previously known batch filtration systems have included oil receiving filtration pans or tanks into which oil from the fryer vat is drained, with a filter assembly placed flat over an outlet port in the bottom of the tank. Such filter assemblies typically utilize a paper filter with a diatomaceous material, sometimes in combination with a screen. These assemblies require some structure atop the paper and filter assembly for holding it in place. Dealing with paper filters can be cumbersome and messy. Similarly, the structure used to hold filters in place can be difficult to handle. Other paperless filter assemblies have been used, with a coupling member separate from the filter assembly providing attachment. Again, such systems can be difficult to handle.

Another issue with prior art filtration systems includes difficulty in cleaning the filtration tank as necessary between filtering operations. Portable filtration tanks/systems on wheels have been used for movement between different fryer devices. Tanks or pans within drawers at the bottom of the fryer device have also been used, but their removability has been limited due to excessive weight, commonly the result of structures attached thereto such as pumps. Further, mating couplets which have been provided in the past. With drawer type units have been subject to heavy wear or even damage due to positive latch mechanisms which have been used to hold the drawer in a closed position, as well as due to exposure of seals when the drawer is in an open position.

Additionally, previously known filtration systems have not provided suitable mechanisms for emptying oil into separate containers. For example, one prior art system requires the use of a separate attachment which can be screwed in line with an oil drain path to divert oil away from the normal drain container and into a separate container.

In any deep fat fryer there may also be the problem of debris/particulate buildup in the fryer vat if the particulate does not drain out of the vat during a filtering operation. This has typically been addressed by a manual cleaning of the bottom of the vat which is a less than desirable technique.

Accordingly, it would be desirable to provide an improved fryer filtration arrangement.

SUMMARY OF THE INVENTION

In one aspect of the present invention, a filtration arrangement for a fryer includes a pan for receiving oil from a fryer vat, the pan including an outlet opening, the outlet opening defining a first coupler. A filter assembly includes an interior defined at least in part by an outer filter screen material, a second coupler connected to the filter assembly and defining a passage which extends from the exterior of the filter assembly into the interior. The first coupler and second coupler are sized and shaped for slidingly mating with each other. The first coupler is mated with the second coupler so that oil traveling out of the pan during a filtration operation travels from the pan, through the outer filter screen material, into the interior of the filter assembly, and out of the interior of the filter assembly through a flow path defined by at least one of the first and second couplers.

In another aspect of the invention, a filtration arrangement for a fryer includes a fryer vat and a pan for receiving oil drained from the fryer vat, with a filter assembly within the pan for filtering oil passing through the pan. An oil drain path leads from an outlet opening of the fryer vat to the pan, and an oil return path leads from the pan back to an inlet opening of the fryer vat. A lower portion of the fryer vat is shaped to direct particulate matter which settles in the fryer vat into a substantially linear region along a bottom surface of the vat. The fryer vat inlet opening is positioned at one end of the substantially linear region and the fryer vat outlet opening being positioned at an opposite end of the substantially linear region for causing oil being circulated during a filtration operation to flow from the fryer vat inlet opening, along the substantially linear region and out the fryer vat outlet opening to push particulate matter lying in the substantially linear region toward and out of the fryer vat outlet opening for delivery to the pan.

Still another aspect of the invention provides a filtration arrangement for a fryer including a fryer vat and a pan for receiving oil drained from the fryer vat, with a filter assembly within the pan for filtering oil passing through the pan. An oil drain path leads from an outlet opening of the fryer vat to the pan, and an oil return path leads from the pan back to an inlet opening of the fryer vat. A latch-free drawer is movable between open and closed positions relative to a fryer frame, and the pan is positioned in the drawer. During a filtration operation oil is drawn out of the pan along the oil return path and delivered back to the fryer vat. The oil return path is defined in part by a return coupler connected to and extending from a portion of the pan. The return coupler is aligned for slidingly mating with a corresponding coupler on the fryer frame when the drawer is moved to a closed position. The oil is drawn out of the pan along the oil return path in a manner which creates a suction force for holding the return coupler of the pan to the corresponding coupler of the fryer frame so as to maintain the drawer in a closed position during a filtration operation.

BRIEF DESCRIPTION OF THE DRAWINGS

FIG. 2 is a side elevation of the oil pan and associated filter assembly of the fryer of FIG. 1;

FIG. 3 is a cross-section of one embodiment of a return coupler which extends from the pan of FIG. 2;

FIG. 4 is a cross-section of one embodiment of a corresponding coupler which receives the coupler of FIG. 3;

DETAILED DESCRIPTION

Figure 1:
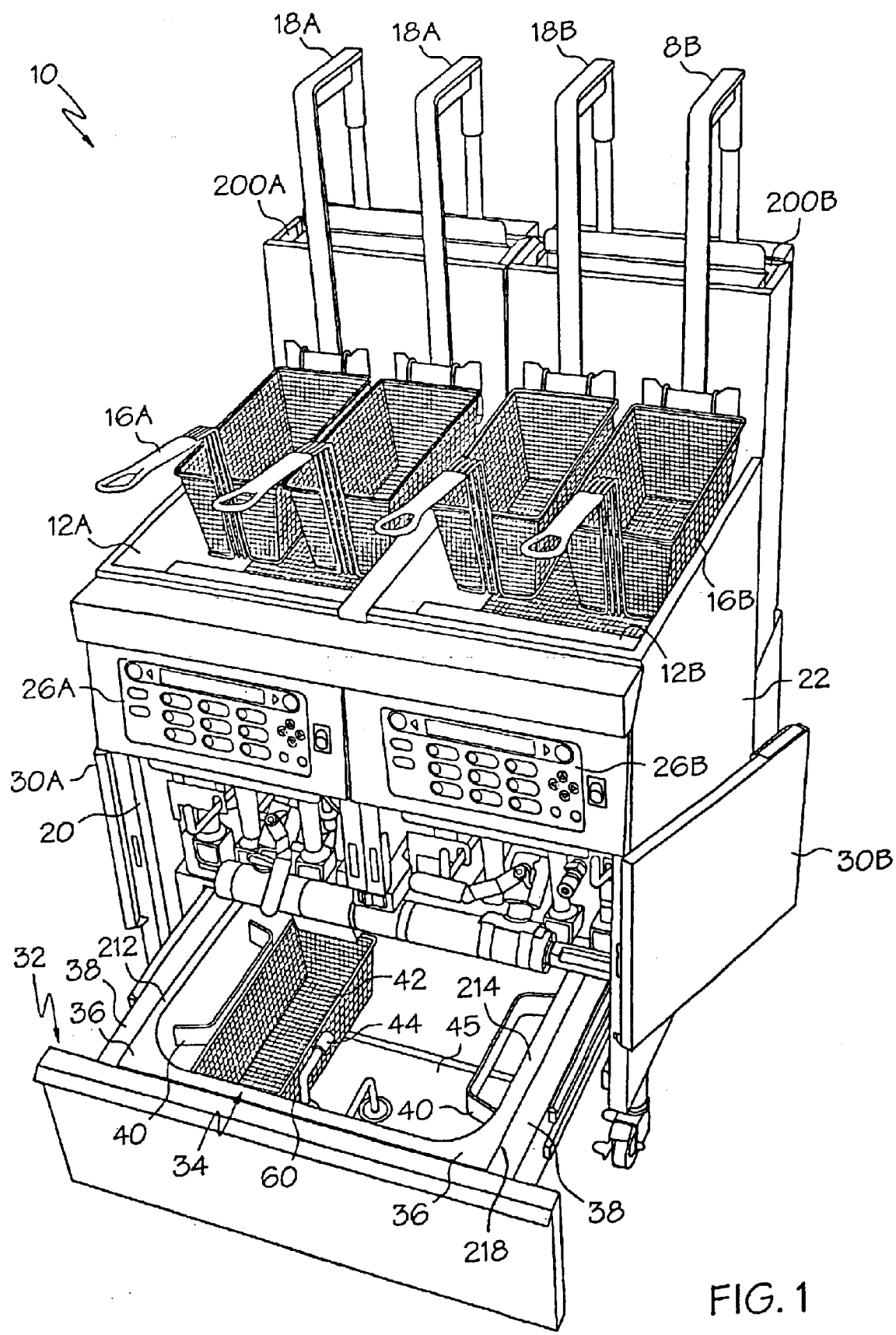
FIG. 1 is a front perspective of one embodiment of a fryer including a filtration arrangement.

Referring to drawing FIG. 1, a perspective view of a typical fryer 10 including two fryer vats 12A and 12B is shown. Each fryer vat includes at least one respective basket 16A and 16B which is automatically movable upward and downward via respective positioning guides 18A and 18B in a manner well known in the art. The fryer 10 includes a frame 20 which preferably includes associated housing 22 such as stainless steel. A front panel 24 of the fryer 10 includes a control and display panel 26A and 26B for each fryer vat. The lower portion of the housing frame includes a set of doors 30A, 30B which are movable between open and closed positions, and which are illustrated in the open position. Below the doors 30A, 30B a drawer 32 which is movable between open and closed positions relative to the frame 20 is provided, the drawer being illustrated in the open position. Positioned within the drawer 32 is an oil receiving pan 34 having a rim 36 which sits on rails 38 of the drawer 32. Handles 40 extend from the interior sidewalls of the pan 34 to allow the pan to be easily picked up and removed from the drawer to facilitate cleaning at a location away from the fryer 10. Positioning of the handles 40 on the inner portion of the pan helps facilitate simple positioning of the pan in the drawer 32. As used herein, the term "pan" is intended to broadly encompass any oil receiving container, unless otherwise specifically indicated.

A basket type screen 42 is removably positioned within the pan 34 for filtering out debris entering the pan 34 within oil which is drained from one of the fryer vats 12A and 12B. At the bottom of the pan 34 a filter assembly 45 is provided for filtering the oil. An oil return path from the pan 34 back to the fryer vat 12A, 12B is formed in part by a coupler 44 which is connected to and extends from a front sidewall of the pan 34. The illustrated coupler 44 extends rearwardly back toward the fryer frame 20. A corresponding coupler 46 (FIG. 2) is positioned on the fryer frame 20, with the two couplers aligned for slidingly mating with each other in a friction fit arrangement when the drawer 32 is moved to a closed position.

In the illustrated fryer 10, each vat 16A, 16B includes an associated exhaust stack 200A, 200B formed at the back of the fryer for venting combustion gases produced by the oil heating system which includes in vat fire tubes as will be described in more detail below with reference to FIGS. 8 and 9.

Referring now to FIG. 2, the pan 34 includes an outlet opening 48 through its bottom wall 50. The oil return path is formed in part by a flow passage through member 52 and piping 54 which runs along the external surface of bottom wall 50 and front wall 56 of the pan 34. The piping 54 may be placed against the surface of walls 50 and 56 as shown in order to provide good heat conduction between the pan 34 and the piping 54. In this manner, when the pan 34 is filled with hot oil as a tank 12A, 12B is drained, the hot oil imparts heat to the piping 54, through the pan 34, before flow through the piping 54 begins. Such heat delivery to the piping 54 aids in prevention of solidification of the oil as it travels through the piping 54, eliminating the need to use separate piping heating means such as thermal tape.

Near the top of front wall 56 a wall penetrating coupling assembly 58 passes through the wall 56, with piping 60 extending upward from the pan 34 and rearwardly as shown. The end of piping 60 acts as the return coupler 44 and is shown in cross-section in FIG. 3. The return coupler 44 mates with corresponding coupler 46 which is shown in cross-section in FIG. 4. In the illustrated embodiment the return coupler 44 comprises a male coupler with a chamfer 62 at its end, and the corresponding coupler 46 comprises a female coupler which includes a chamfered opening 64 to facilitate sliding engagement with return coupler 44. The internal surface of coupler 46 includes two annular recesses 66 for receiving sealing members such as o-rings 67 which engage the outer surface of the return coupler 44 in a friction fit manner when the coupler 44 is inserted therewithin. The internal o-rings 67 thus remain unexposed and protected from damage when the drawer 32 is opened and the return coupler 44 is removed from coupler 46.

Figure 5:
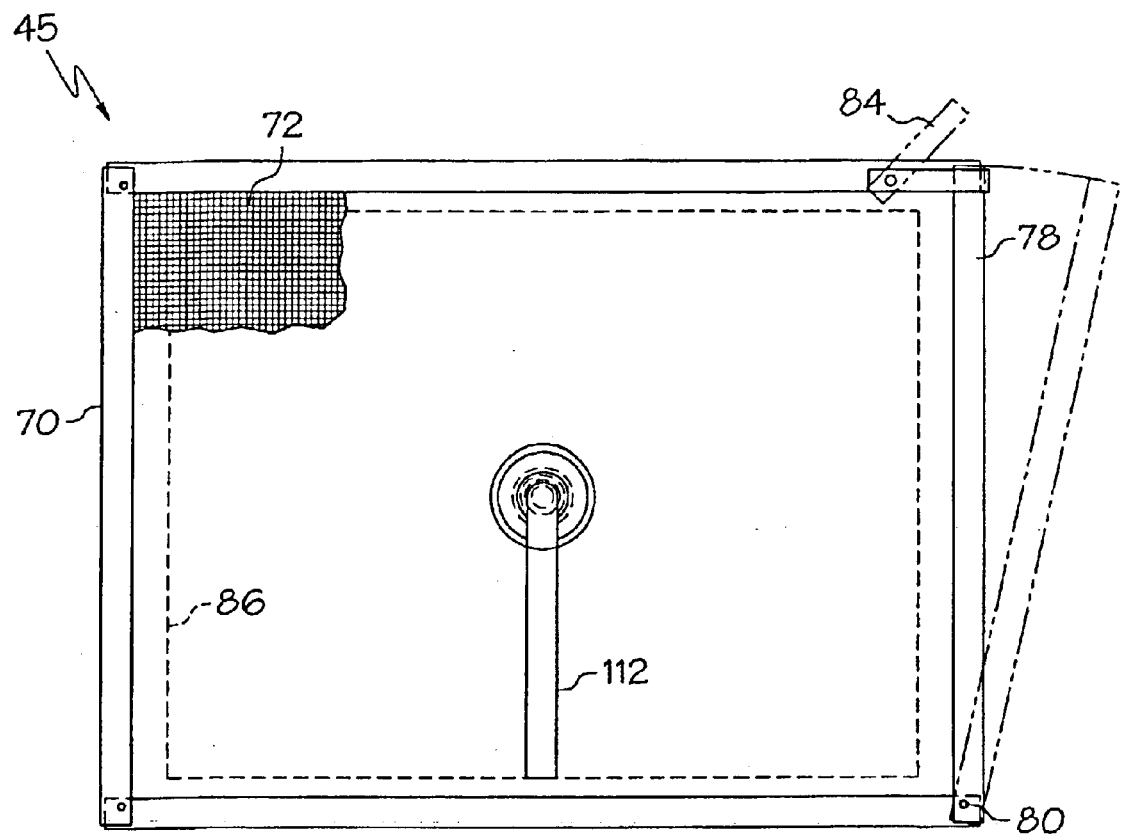
FIG. 5 is a top view of one embodiment of a filter assembly.
Figure 6:
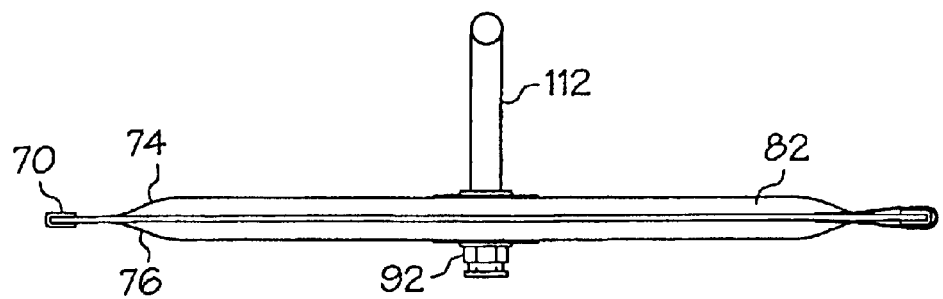
FIG. 6 is a side elevation of the filter assembly of FIG. 5.
Figure 7:
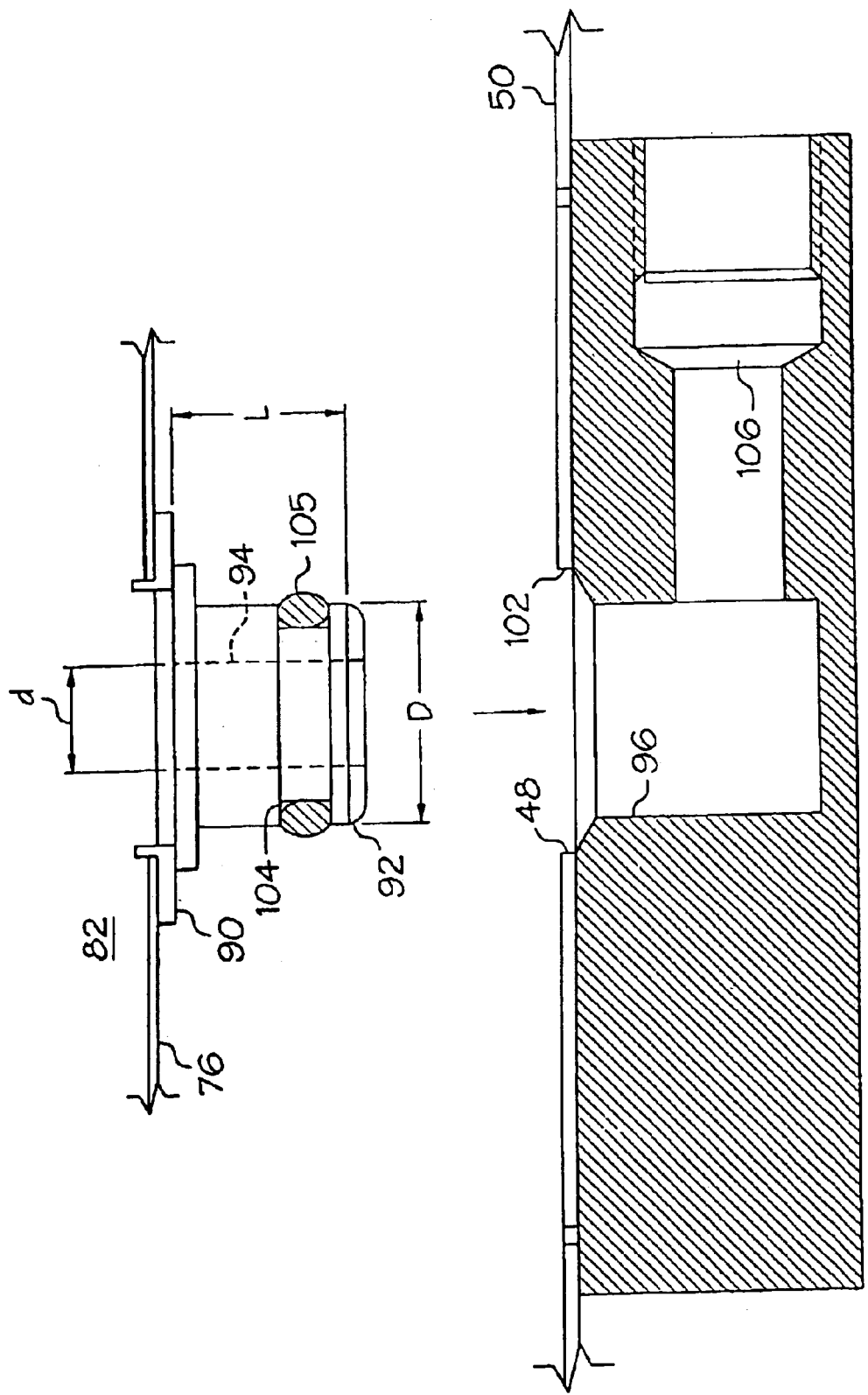
FIG. 7 illustrates one embodiment of a filter assembly and pan coupling arrangement.

One embodiment of a filter assembly 45 is shown in FIGS. 5 and 6. A rectangular metal frame 70 surrounds a stainless steel wire mesh or other filter screen material 72. The filter assembly is envelope-shaped and includes an upperside 74 and underside 76. While substantially the entire surface area formed by both the upperside 74 and underside 76 may be formed by the filter screen material, it is recognized that a lesser portion could be formed by the filter screen material. One side 78 of frame 70 is pivoted at corner 80 to permit movement between an open position (shown in shadow) and a closed position, with the open position providing access to an interior 82 of the assembly. Latch 84 holds frame portion 80 in the closed position when desired. Positioned within the interior 82 of the filter assembly is a removable spacer member 86 which may be in the form of a stainless steel wire-basket weave which allows oil to flow therethrough. The spacer member aids in holding the upperside 74 away from the underside 76 during operation. The underside 76 of the filter assembly includes an opening 88 therethrough which is surrounded by an annular flange 90, best seen in the partial exploded elevation/cross-section of FIG. 7. The upperside 74 of the filter assembly includes a similar opening and annular flange, not shown. The subject filter assembly in the above form, with an opening on its upperside and underside, is commercially available from Filter-All Inc. of Magnolia, Tex.

The subject commercially available filter is modified by connecting a coupler 92 having a flow passage 94 therethrough to the opening 88 on the underside 76, such as by welding to the flange 90. The passage 94 leads from the exterior of the filter assembly 45 to its interior 82. An L-shaped handle member 112 is connected to the opening and flange at the upperside 74 of the filter assembly 45 to seal off the upperside opening. The handle facilitates manual installation and removal of the filter assembly. The handle member 112 may be welded or otherwise connected to the upperside 74 of the filter assembly 45.

The coupler 92 is sized and shaped for mating with a coupler 96 which is defined by opening 48 in the bottom wall 50 of the pan 34. In the illustrated embodiment, the coupler 96 is formed in member 52 which may be welded or otherwise connected to the exterior surface of the bottom wall 50. The entry to coupler 96 may be chamfered at 102 to facilitate coupler 92 being slidingly inserted therein. Coupler 92 may include an annular recess 104 which receives a sealing member such as an o-ring 105 for engaging an inner surface of coupler 96. A friction fit, quick connect/disconnect arrangement is thereby provided. It is recognized that the o-ring could be located internally along the wall of coupler 96. In one embodiment the coupler 92 has a cylindrical outer shape and has an outer diameter D between about 0.720" and about 0.750", a length L between about 0.4" and about 0.6", and a through diameter d between about 0.350" and 0.400", with a preferred outer diameter of about 0.735", a preferred length of about 0.5", and a preferred through diameter of about 0.350". While the illustrated embodiment shows coupler 92 as a male coupler and coupler 96 as a female coupler, it is recognized that in other embodiments the coupler associated with filter assembly 45 could comprise a female coupler and that a male coupler could extend from the bottom wall 50 of the pan. Passage 106 is provided for leading to and coupling with piping 54 shown in FIG. 2.

Referring again to FIG. 2, the oil return path includes a pump 110 positioned therealong for drawing oil out of the pan 34. Oil traveling out of the pan 34 during a filtration operation travels from the pan 34, through the outer filter screen material 72 of the filter assembly 45, into the interior 82 of the filter assembly 45, and out of the interior 82 of the filter assembly 45 through a flow path defined by at least one of the couplers 92 and 96. Operation of the pump 110, and the associated flow of oil drawn out of the pan 34, creates a suction force for holding the coupler 92 of the filter assembly 45 to the coupler 96 of the pan 34, without requiring any latch or hold down member. The friction fit arrangement of o-ring 105 and inner surface of coupler 96 also aids in holding coupler 92 to coupler 96. The suction force created by the pump 110, and the associated flow of oil drawn out of the pan 34, also holds the return coupler 44 of the pan 34 to the corresponding coupler 46 of the fryer frame 20 so as to maintain the drawer 32 in a closed position during a filtration operation, without requiring any positive latch. The friction fit engagement of o-ring 67 with the outer surface of return coupler 44 also aids in holding return coupler 44 to corresponding coupler 46.

In one embodiment, when the couplers 92 and 96 are fully coupled at least part of the underside 76 of the filter assembly 45 is spaced from the bottom wall 50 of the pan 34 to enable oil to flow through both the upperside 74 and underside 76 of the filter assembly 45 as it is drawn out of the pan 34. This arrangement provides a greater oil filtering surface area as compared to systems in which the filter material, such as paper media, lies flat against the bottom wall 50 of the pan 34. Positioning pegs or posts may be provided on the bottom wall 50 of the pan 34 for such purpose, or could likewise extend from the underside 76 of the filter assembly 45. Channels could also be formed in the bottom wall 50 of the pan 34.

Figure 8:
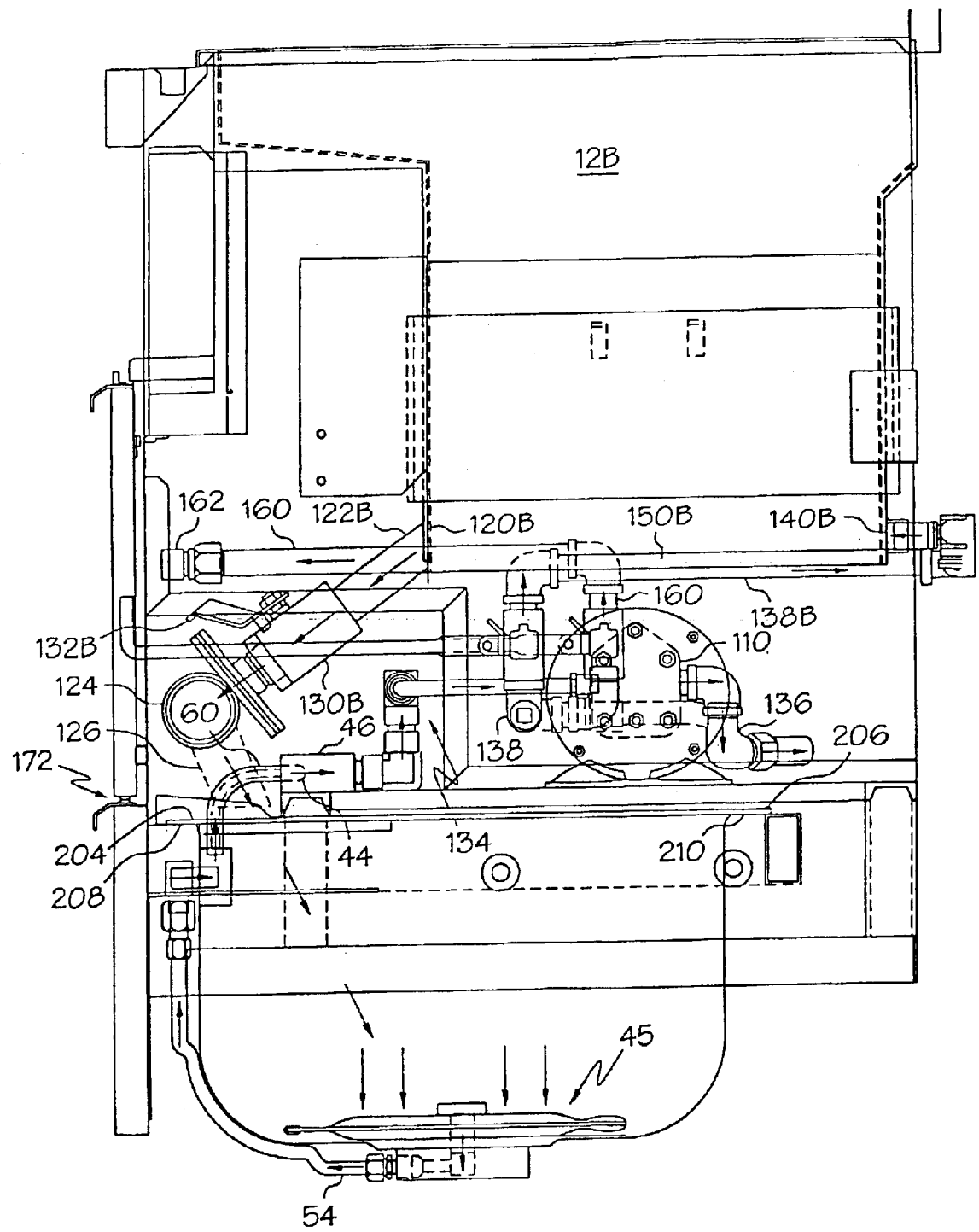
FIG. 8 is a schematic side elevation of the fryer of FIG. 1.
Figure 9:
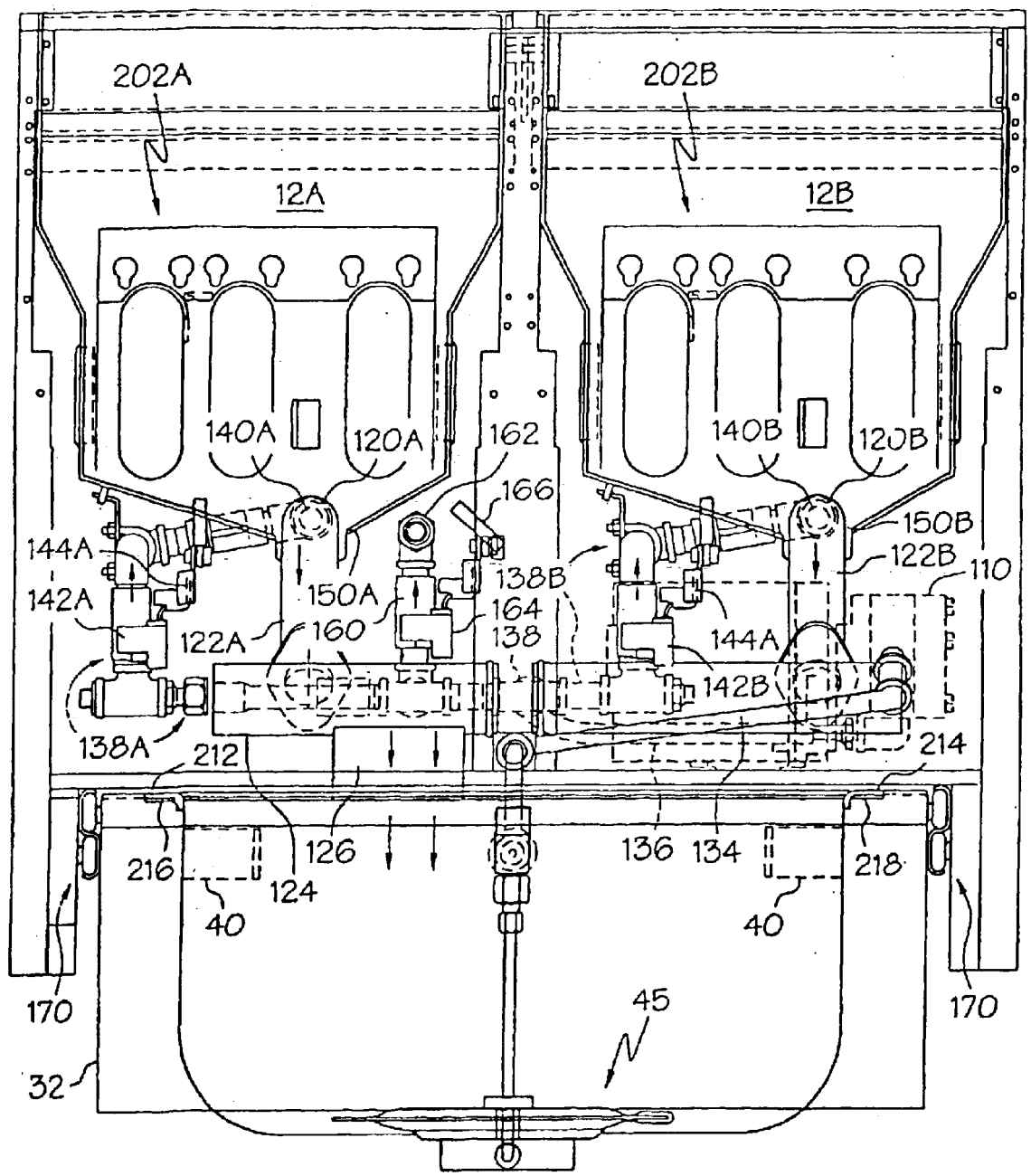
FIG. 9 is a schematic front elevation of the fryer of FIG. 1.

Referring now to drawing FIGS. 8 and 9, the fryer 10 including one embodiment of the subject fryer filtration arrangement is shown schematically in side and front elevation respectively. The fryer vat 12B is shown by two spaced, adjacent dashed lines in FIG. 8 and by two spaced, adjacent solid lines in FIG. 9. An outlet opening 120A, 120B in a wall of each vat 12A, 12B leads to a respective draining pipe 122A, 122B. The two draining pipes 122A, 122B lead to a common drain pipe 124 which extends laterally across a front portion of the fryer 10. The common drain pipe 124 includes an outlet 126 for delivering oil into the pan 34. Thus, each vat 12A, 12B includes a respective oil drain path extending from its outlet opening 120A, 120B to the pan 34. Positioned along each oil drain path is a flow control device 130B (seen only in FIG. 8) for controlling the draining of each vat. In particular, each flow control device may be a manually operable valve including a respective handle 132B for permitting a user to open and close the drain path as desired. Of course, other flow control devices may be used, including automatically controlled devices.

The oil return path from the pan 34 is formed in part by piping 54 and 60, return coupler 44 and corresponding coupler 46. Piping 134 leads from the coupler 46 to the pump 110. The outlet side of the pump 110 connects to piping 136 which extends to common piping 138. Common piping 138 includes segment 138A which, relative to the front view FIG. 9, runs to the left, upward, rearward and then to the right, to an inlet opening 140A in the vat 12A. Relative to the front view of FIG. 9, segment 138B runs to the right, upward, rearward and then to the right, to an inlet opening 140B in the vat 12B. Each segment 138A, 138B includes a respective flow control device 142A, 142B positioned theralong for controlling flow back to its respective vat 12A, 12B. The flow control devices may, for example, be manually operable valves including respective handles 144A, 144B for operation by a user.

By way of example, to filter the oil in vat 12B, the flow control device 130B is opened to permit oil to drain into the pan 34. The flow control device 142B is also opened to permit oil to be delivered back to the vat 12B. The pump 110 is then operated an oil is cycled from the pan 34, through the filter assembly 45, back along the oil return path through the pump 10 and to the vat 12B. During such operation the flow control devices 130A (not shown) and 142A are maintained in closed positions to prevent oil from draining from vat 12A and to prevent oil from being returned to vat 12A. When sufficient filtering has been achieved, the flow control device 130B is closed so that the vat 12B fills as oil is returned thereto by the pump 110. At the conclusion of the filtration operation the flow control device 142B is closed and the pump 110 is turned off.

Notably, a lower portion of each fryer vat 12A, 12B is shaped to direct particulate matter which settles in the fryer vat into a substantially linear region 150A, 150B along a bottom surface of the vat. In the illustrated embodiment this substantially linear settling is achieved using inclined bottom walls as best seen in the front view of FIG. 9. Each fryer vat inlet opening 140A, 140B is positioned at one end of the substantially linear region and each fryer vat outlet opening 120A, 120B is positioned at an opposite end of the substantially linear region for causing oil being circulated during a filtering operation to flow from the fryer vat inlet opening 140A, 140B, along the substantially linear region 150A, 150B, and out the fryer vat outlet opening 120A, 120B to push particulate matter lying in the substantially linear region toward and out of the fryer vat outlet opening 120A, 120B for delivery to the pan 34. In the illustrated embodiment, as best shown in FIG. 8 relative to vat 12B, each fryer vat 12B includes a front wall. 152B and a back wall 154B, with the fryer vat inlet opening 140B formed in the back wall 154B, and the fryer vat outlet opening 120B formed in the front wall 152B. It is recognized that the relative positioning of the inlet and outlet openings on the front and back walls could be reversed, or that the openings could be formed in the sidewalls or bottom wall of the vat 12B. A channel could also be provided in the bottom of each vat to further define the substantially linear region of settling.

Also connected to common piping 138 is an oil dump path defined by piping 160. The piping 160 extends to a forward portion of the fryer frame 20 and includes a quick-disconnect coupling 162 at its end to facilitate connection of a hose which can be used to empty oil from the pan 34 into a separate container. A flow control device 164 is positioned along the oil dump path for controlling the flow of oil therealong. The flow control device 64 may, for example, be a manually operable valve including a handle 166 for operation by a user. In the illustrated embodiment, an oil dump is achieved by opening the flow control device 130A, 130B associated with the drain path of the vat to be dumped. The oil drains into the pan 34. The flow control device 164 is then opened and flow control devices 142A and 142B are maintained closed. When the pump 110 is operated, oil will be delivered to the piping 160 and out of the quick-disconnect coupling 162 when a hose is connected thereto.

Also shown in FIG. 8 is the fire tube assembly 202A, 202B of each vat. Each fire tube assembly includes at least one associated gas burner (not shown) for generating heat which passes along the fire tube(s) of its respective assembly 202A, 202B. The fire tubes are submerged in the oil, below the baskets 16A, 16B, to thereby heat the oil. Exhaust gases are vented via stacks 200A, 200B shown in FIG. 1. The filtering arrangement of the present invention is particularly useful in fryers having above-described heating arrangement, because the cooking oil is not continuously recirculated.

Referring to FIG. 9, the wheel and rail arrangement 170 of the drawer 32 is also shown. Front and back lips or flanges 204 and 206 which extend from the top of the pan 34 rest on pan supporting surfaces 208 and 210 which may be formed by drawer frame rails or struts. The pan 34 may also include left and right lips/flanges 212 and 214 best seen in FIG. 8, which rest on pan supporting surfaces 216 and 218 of the drawer 32. The lip/flange and support arrangement permits the pan 34 to be easily removed from drawer 32, using handles 40, without requiring manual disconnection of any components once the drawer 32 is opened. The pan 34 may be of stamped stainless steel construction. The side view of FIG. 8 shows aligned magnets 172 positioned at the front, top edge of the drawer and a front, lower edge of the fryer frame/housing for holding the drawer in the closed position during periods of non-filtration. No positive latching mechanism is required for the drawer.

As illustrated, the pan 34 includes curved corners (e.g., corners 302, 304 of FIG. 1) where the upright front wall, back wall and sidewalls of the pan meet. The pan 34 also includes curved corners where the upright sidewalls meet the bottom wall of the pan (e.g., corners 306, 308 of FIG. FIG. 9) and curved corners where the upright front and back walls meet the bottom wall of the pan (e.g., corners 310, 312, of FIG. 8). The illustrated lip (e.g., formed by front lip 204, back lip 206 and side lips 212 and 214) extends about the entire periphery of the pan. In the stamped embodiment described above, the lip is unitary with the walls of the pan. Likewise, in the stamped embodiment described above the upright front wall, back wall and sidewalls are unitary with each other and the bottom wall of the pan.

Although the invention has been described and illustrated in detail it is to be clearly understood that the same is intended by way of illustration and example only and is not intended to be taken by way of limitation. For example, while a fryer including two vats has been shown in the illustrated embodiment, fryers including more or less vats could incorporate the subject filtration arrangement. Further, while the illustrated filter assembly is generally rectangular and envelope shaped, other filter assembly shapes could be used. While the filter assembly connects to the bottom wall of the pan, the outlet opening of the pan, and thus connection of the filter assembly, could also be on one of the front, back or side walls. Still further, while the illustrated coupling arrangement between the filter assembly and pan is formed by slidingly cooperating couplers, in some cases threaded couplers might be used, in which case the filter assembly handle could be used to rotate the filter assembly to achieve the desired threaded connection.

Accordingly, the spirit and scope of the invention are to be limited only by the terms of the appended claims.

What is claimed is:

1. A fryer, comprising:

a fryer vat;

an oil drain path leading from the fryer vat;

a pan for receiving oil drained from the fryer vat along the oil drain path, the pan including an upright front wall, an upright back wall, upright first and second sidewalls, and a bottom wall, a first curved corner where the upright front wall meets the upright first sidewall, a second curved corner where the upright back wall meets the upright first sidewall, a third curved corner where the upright back wall meets the upright second sidewall, a fourth curved corner where the upright second sidewall meets the upright front wall, a fifth curved corner where the upright front wall meets the bottom wall, a sixth curved corner where the upright first sidewall meets the bottom wall, a seventh curved corner where the upright back wall meets the bottom wall and an eighth curved corner where the upright second sidewall meets the bottom wall;

wherein a lip extends about an entire periphery of the pan at its upper edge, the lip is unitary with the upright front wall, upright back wall and upright first and second sidewalls;

wherein the upright front wall, upright back wall, upright first and second sidewalls, and bottom wall are unitary with each other;

wherein the pan is movable between an open position and a closed position relative to a fryer frame, the pan includes a filter system with associated oil return piping, the oil return piping extends above an upper edge of the pan at a location near the upright front wall of the pan and then extends rearward, terminating in a return coupler that slidingly mates with a corresponding coupler located on the fryer frame.

2. The fryer of claim 1 wherein the pan is removable from the fryer.

3. The fryer of claim 2 where the pan includes spaced apart handles for use in removing the pan from the fryer and carrying of the pan.

4. The fryer of claim 1 wherein a wheel and rail arrangement is provided to facilitate movement of the pan between the open position and the closed position.

5. The fryer of claim 1 wherein a filter basket is located for having oil pass therethrough before entering the pan from the oil drain path.

6. The fryer of claim 1 wherein a bottom of the pan is spaced above the ground when in the open position.

7. A fryer, comprising:

a fryer vat;

an oil path leading from the fryer vat;

a pan for receiving oil traveling drained from the fryer vat along the oil drain path, the pan including an upright front wall, an upright back wall, upright first and second sidewalls, and a bottom wall, a first curved corner where the upright front wall meets the upright first sidewall, a second curved corner where the upright back wall meets the upright first sidewall, a third curved corner where the upright back wall meets the upright second sidewall, a fourth curved corner where the upright second sidewall meets the upright front wall, a fifth curved corner where the upright front wall meets the bottom wall, a sixth curved corner where the upright first sidewall meets the bottom wall, a seventh curved corner where the upright back wall meets the bottom wall and an eighth curved corner where the upright second sidewall meets the bottom wall;

wherein the pan is movable between an open position and a closed position relative to a fryer frame, the pan includes a filter system with associated oil return piping, the oil return piping extends upward at a location near the upright front wall of the pan and then extends rearward, terminating in a return coupler that slidingly mates with a corresponding coupler located on the fryer frame.

8. The fryer of claim 7 wherein the pan includes a lip that extends from the pan at an upper edge of at least the first and second sidewalls.

9. The fryer of claim 8 wherein the lip extends about an entire periphery of the upper edge of the pan.

10. The fryer of claim 7 wherein the upright front wall, upright back wall, upright first and second sidewalls, and bottom wall are unitary with each other.

11. The fryer of claim 7 wherein the pan is removable from the fryer.

12. The fryer of claim 7 wherein a wheel and rail arrangement is provided to facilitate movement of the pan between the open position and the closed position.

13. The fryer of claim 7 wherein a filter basket is located for having oil pass therethrough before entering the pan from the oil drain path.

14. The fryer of claim 7 wherein a bottom of the pan is spaced above the ground when in the open position.

15. A fryer, comprising:

a fryer vat;

an oil drain path leading from the fryer vat;

a pan for receiving oil traveling drained from the fryer vat along the oil drain path, the pan including an upright front wall, an upright back wall, upright first and second sidewalls, and a bottom wall, a first curved corner where the upright front wall meets the upright first sidewall, a second curved corner where the upright back wall meets the upright first sidewall, a third curved corner where the upright back wall meets the upright second sidewall, a fourth curved corner where the upright second sidewall meets the upright front wall;

wherein the pan is movable between an open position and a closed position relative to a fryer frame, the pan includes a filter system with associated oil return piping, the oil return piping extends upward at a location near the upright front wall of the pan and then extends rearward, terminating in a return coupler that slidingly mates with a corresponding coupler located on the fryer frame.

16. A fryer, comprising:

a fryer vat;

an oil drain path leading from the fryer vat;

a pan for receiving oil traveling drained from the fryer vat along the oil drain path, the pan including an upright front wall, an upright back wall, upright first and second sidewalls, and a bottom wall, a first curved corner where the upright front wall meets the bottom wall, a second curved corner where the upright first sidewall meets the bottom wall, a third curved corner where the upright back wall meets the bottom wall and a fourth curved corner where the upright second sidewall meets the bottom wall;

wherein the pan is movable between an open position and a closed position relative to a fryer frame, the pan includes a filter system with associated oil return piping, the oil return piping extends upward at a location near the upright front wall of the pan and then extends rearward, terminating in a return coupler that slidingly mates with a corresponding coupler located on the fryer frame.

17. A fryer comprising:

a fryer vat;

a pan for receiving oil drained from the fryer vat, a filter assembly within the pan for filtering oil delivered to the pan, the filter assembly including associated oil return piping that extends above an upper edge of the pan at a location near an upright front wall of the pan and then extends rearward, terminating in a return coupler, wherein the pan is movable between an open position and a closed position relative to a fryer frame;

an oil drain path leading from an outlet opening of the fryer vat to the pan;

an oil return path leading from a corresponding coupler on the fryer back to an inlet opening of the fryer vat;

the return coupler slidingly mates with the corresponding coupler when the pan is moved to the closed position, wherein the return coupler comprises a male coupler that lacks any sealing ring and the corresponding coupler comprises a female coupler with at least one internally seated sealing ring.

18. The fryer claim 17 wherein a wheel and rail arrangement is provided to facilitate movement of the pan between the open position and the closed position.

19. The fryer claim 17 wherein spaced apart rails facilitate movement of the pan between the open position and the closed position.

* * * * *

UNITED STATES PATENT AND TRADEMARK OFFICE
CERTIFICATE OF CORRECTION

PATENT NO. : 6,890,428 B2
DATED : May 10, 2005
INVENTOR(S) : Alfred Edward Mullaney, Jr.

It is certified that error appears in the above-identified patent and that said Letters Patent is hereby corrected as shown below:

Column 9,
Line 5, after the word "oil", insert -- drain --.
Lines 6 and 50, after the word "oil" delete the word "traveling".
Line 52, delete the words "upright back wall" (second occurrence).

Column 10,
Line 12, after the word "oil" delete the word "traveling".
Line 46, after the words "the fryer" (first occurrence), insert -- frame --.
Lines 53 and 56, after the word "fryer" insert -- of --.

Signed and Sealed this

Twelfth Day of July, 2005

JON W. DUDAS
*Director of the United States Patent and Trademark Office*